(12) United States Patent
Shimizu

(10) Patent No.: US 8,233,759 B2
(45) Date of Patent: Jul. 31, 2012

(54) OPTICAL WAVEGUIDE AND OPTICAL TOUCH PANEL

(75) Inventor: Yusuke Shimizu, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 235 days.

(21) Appl. No.: 12/715,834

(22) Filed: Mar. 2, 2010

(65) Prior Publication Data

US 2010/0225603 A1 Sep. 9, 2010

(30) Foreign Application Priority Data

Mar. 9, 2009 (JP) ................................. 2009-055103

(51) Int. Cl.
*G02B 6/32* (2006.01)
(52) U.S. Cl. .......................................... 385/33
(58) Field of Classification Search ........................ None
See application file for complete search history.

(56) References Cited

U.S. PATENT DOCUMENTS

2007/0189668 A1* 8/2007 Payne ............................. 385/33
2008/0198144 A1 8/2008 Shimizu et al.

FOREIGN PATENT DOCUMENTS

JP 2007-70320 A 3/2007
JP 2008-203431 A 9/2008

* cited by examiner

*Primary Examiner* — Sung Pak
(74) *Attorney, Agent, or Firm* — Westerman, Hattori, Daniels & Adrian, LLP

(57) ABSTRACT

An optical touch panel of the present invention is capable of protecting a core 12 from outside light 17 without increasing a thickness in a frame portion by providing a concave portion 14b on an over-cladding layer 14 in an optical waveguide 10 to fit the concave portion 14b into a frame body 15 of the optical touch panel. In the optical touch panel of the present invention, alignment precision of the optical waveguide 10 is improved to easily obtain a high transmission efficiency because the optical waveguide 10 and the frame body 15 are integrated.

8 Claims, 3 Drawing Sheets

(a)

(b)

OPTICAL WAVEGUIDE AND OPTICAL TOUCH PANEL

BACKGROUND OF THE INVENTION

1. Field of the Invention

The present invention relates to an optical waveguide preferably used for a touch panel and an optical touch panel.

2. Description of the Related Art

Conventionally, an optical waveguide which comprises: cores including a light incident core having an end and a light emitting core having an end; an under-cladding layer for supporting the cores; and an over-cladding layer with a convex lens portion having a side cross-sectional shape of substantially a quarter of a circle is known (For example, JP 2008-203431 A). In such an optical waveguide, diverging light emitted from the ends of the cores can be converted into parallel light in the convex lens portion. Further, parallel light having a great width incident upon the surface of the convex lens portion can focus light on the ends of the cores in the convex lens portion. As a result, a high optical transmission efficiency can be obtained.

Generally, in optical touch panels, infrared rays are used for a touch detection, so that touch detection may be not possible when strong outside light, such as sun light is incident on a detection part. Optical touch panels with conventional optical waveguides have not sufficiently resolved a problem of a reduction in touch detection accuracy.

SUMMARY OF THE INVENTION

Since infrared rays are used for a touch detection in optical touch panels, touch detection may be not possible when strong outside light, such as sun light is incident on a detection part. Optical touch panels with conventional optical waveguides have not sufficiently resolved the problem of a reduction in touch detection accuracy. It is an object of the present invention to provide an optical waveguide usable under an environment of strong outside light without an increase in thickness of an optical waveguide portion (a frame portion of the optical touch panel) and an optical touch panel thereof.

An optical waveguide according to the present invention is capable of protecting a core from outside light without increasing a thickness in a frame portion by providing a concave portion on an over-cladding layer in the optical waveguide to fit the concave portion into a frame body of the optical touch panel. In the optical touch panel of the present invention, alignment precision of the optical waveguide is improved to easily obtain a high transmission efficiency because the optical waveguide and the frame body are integrated.

The gist of the present invention is as follows:

In a first preferred embodiment, an optical waveguide according to the present invention comprises: a core having a distal end from which light is emitted or on which light is incident; an under-cladding layer for supporting the core; and an over-cladding layer wherein the core is embedded, the optical waveguide being arranged in contact with a frame body of an optical touch panel, and the over-cladding layer has a convex lens portion having a side sectional shape of substantially a quarter of a circle and a concave portion to be fitted into the frame body of the optical touch panel, wherein the concave portion is located outside a substantially fan-shaped region surrounded by line segments to connect from the center of the distal end of the core to an upper end and a lower end of the convex lens portion of the over-cladding layer and a circle of the convex lens portion.

In a second preferred embodiment of the optical waveguide according to the present invention, the core has a higher refractive index than the under-cladding layer and the over-cladding layer and the refractive index difference among the core, the under-cladding layer, and the over-cladding layer is from 0.02 to 0.2.

In a third preferred embodiment of the optical waveguide according to the present invention, the core, the under-cladding layer, and the over-cladding layer are respectively formed from a UV curable resin.

In a fourth preferred embodiment of the optical waveguide according to the present invention, when the radius of curvature of the convex lens portion of the over-cladding layer is D, the radius of curvature D is 300 μm to 1.5 mm.

In a fifth preferred embodiment of the optical waveguide according to the present invention, when the distance from a distal end of the convex lens portion of the over-cladding layer to the distal end of the core is A, the distance A is 1 to 5 mm and the ratio A/D between the distance A and the radius of curvature D of the convex lens portion is 2 to 6.

In a sixth preferred embodiment of the optical waveguide according to the present invention, the concave portion of the over-cladding layer has a depth of 200 to 900 μm and the over-cladding layer in the concave portion has a remaining depth of 100 to 700 μm.

In a seventh preferred embodiment, an optical touch panel according to the present invention has the aforementioned optical waveguide, wherein the concave portion of the over-cladding layer in the optical waveguide is fitted into the frame body of the optical touch panel.

ADVANTAGE OF THE INVENTION

The optical touch panel of the present invention is capable of preventing outside light from entering the core by providing a concave portion on the over-cladding layer in the optical waveguide to fit the frame body of the optical touch panel into the concave portion without increasing a thickness in the frame portion. Further, alignment precision of the optical waveguide is improved to easily obtain a high transmission efficiency because the optical waveguide and the frame body are integrated For a full understanding of the present invention, reference should now be made to the following detailed description of the preferred embodiments of the invention as illustrated in the accompanying drawings.

DESCRIPTION OF THE PREFERRED EMBODIMENTS

Figure 1:
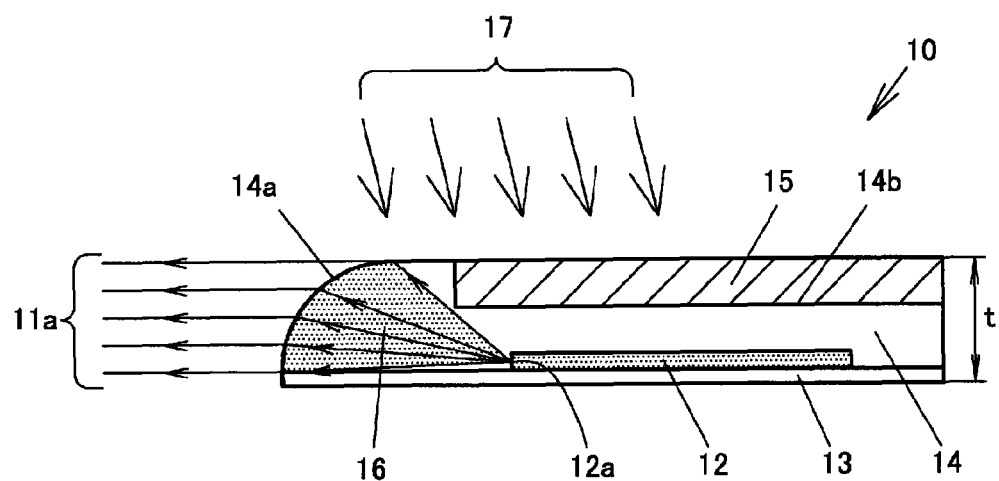
FIG. 1(a) is a schematic view at the time when an optical waveguide of the present invention emits light.
FIG. 1(b) is a schematic view at the time when light is incident on the optical waveguide of the present invention.
Figure 1:
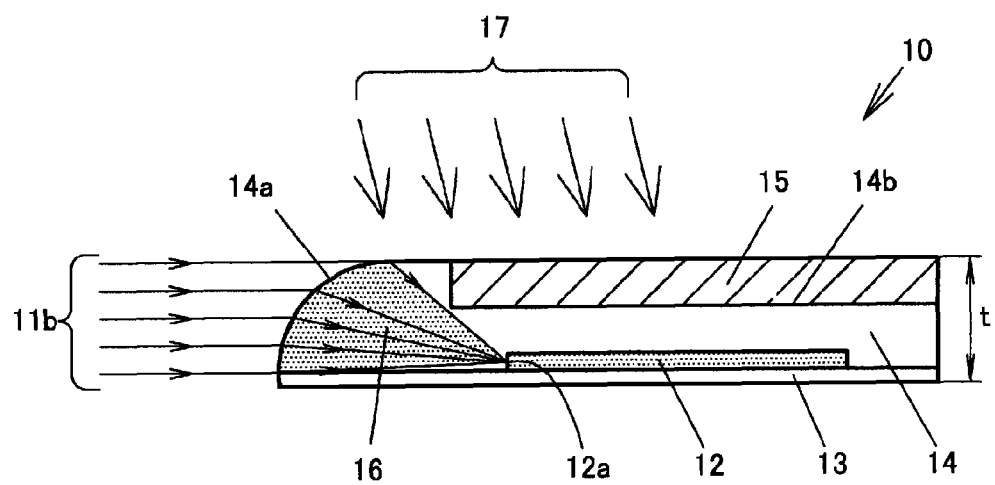

The preferred embodiments of the present invention will now be described with reference to FIGS. 1-4 of the drawings. Identical elements in the various figures are designated with the same reference numerals.

[Optical Waveguide]

As shown in FIGS. 1(a) and 1(b), an optical waveguide 10 comprises: a core 12 having a distal end 12a (FIG. 1(a)) for emitting light 11a (FIG. 1(a)) or a distal end 12a on which light 11b is incident (FIG. 1(b)); an under-cladding layer 13 for supporting the core 12; and an over-cladding layer 14 where the core 12 is embedded, wherein the optical waveguide 10 is arranged so as to be in contact with a frame body 15 (shaded portion) of an optical touch panel. The over-cladding layer 14 comprises: a convex lens portion 14a having a side sectional shape of substantially a quarter of a circle; and a concave portion 14b fitted into the frame body 15. The frame body 15 is opaque and blocks outside light (visible light to infrared light).

The concave portion 14b of the over-cladding layer 14 is located outside a substantially fan-shaped region 16 (shaded portion in the figure) surrounded by line segments to connect from the center of the distal end 12a of the core 12 to upper and lower ends of the convex lens portion 14a in the over-cladding layer 14 and an outer circle of the convex lens portion 14a. When the concave portion 14b in the over-cladding layer 14 protrudes into the region 16, there are fears that emitting light 11a and incident light 11b may be blocked by the concave portion 14b. Since the frame body 15 of the optical touch panel is fitted into the concave portion 14b in the over-cladding layer 14, the optical waveguide 10 of the present invention can prevent outside light 17 (e.g., sun light) from entering the core 12 without increasing a thickness t.

Moreover, the optical waveguide 10 of the present invention is improved in position accuracy because the optical waveguide 10 is fitted into the frame body 15 having high mechanical dimensional accuracy to be integrated. More specifically, since the position accuracy of the light 11a to be emitted and the relative position accuracy between the light 11b to be incident and the distal end 12a of the core 12 is improved, it is possible to easily obtain a high optical transmission efficiency.

The optical waveguide 10 of the present invention is preferably used for an optical touch panel. The optical touch panel herein referred determines the coordinate by forming a grid of light beams (generally infrared rays) and detecting the position and strength of the light beams blocked by a finger or a pen.

Figure 2:
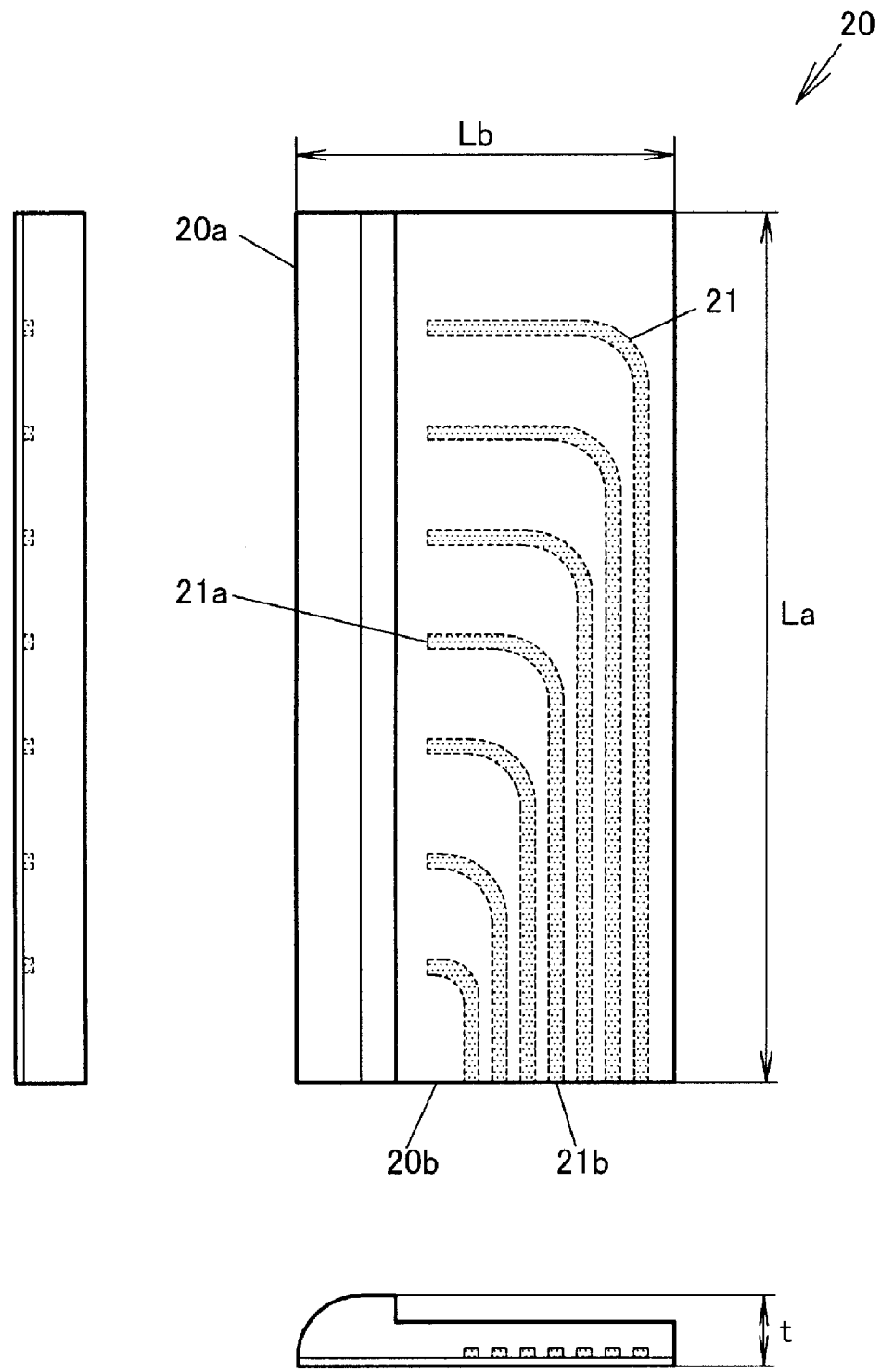
FIG. 2 is a schematic view of an optical waveguide of the present invention.

Typically, as shown in FIG. 2, in an optical waveguide 20 of the present invention, light is emitted or incident on distal ends 21a of a plurality of cores 21 arranged in parallel on a long side 20a as one embodiment. Other ends 21b of the cores 21 are preferably formed on a short side 20b.

When the light 11a is emitted from the distal ends 21a of the cores 21 on the long side 20a in the optical waveguide 20, typically, the other ends 21b of the cores 21 are optically connected to a light-emitting element (not shown in the figure). Further, when the light 11b is incident on the distal ends 21a of the cores 21 on the long side 20a, typically, the other ends 21b of the cores 21 are optically connected to a light-receiving element (not shown in the figure).

The maximum thickness t of the optical waveguide 20 is not particularly limited, but is usually 50 µm to 2 mm. The length La of the long side 20a in the optical waveguide 20 is appropriately set in accordance with the size of the display screen of the optical touch panel. The length Lb of the short side 20b in the optical waveguide 20 is preferably 1 to 15 mm.

[Core]

The core 12 to be used for the present invention is formed from any material having a higher refractive index than a cladding layer (an under-cladding layer 13 and an over-cladding layer 14 are collectively referred to as cladding layer) and high transparency at the wavelength of light traveling through the core 12. A material forming the core 12 is preferably a UV curable resin having excellent patterning properties. Preferred examples of such a UV curable resin include UV curable acrylic resins, UV curable epoxy resins, UV curable siloxane resins, UV curable norbornene resins, and UV curable polyimide resins or the like.

The cross-sectional shape of the core 12 that is perpendicular to the direction in which light travels is not particularly limited, but is preferably trapezoidal or rectangular from the viewpoint of patterning properties. FIG. 2 shows a case where the cross-section is rectangular. The base width of the cross section of the core 12 (core width) that is perpendicular to the direction in which light travels is preferably in the range of 30 to 500 µm. The height of the cross section of the core 12 (core height) that is perpendicular to the direction in which light travels is preferably in the range of 30 to 100 µm.

[Under-Cladding Layer]

The under-cladding layer 13 to be used for the present invention is formed from any material having a lower refractive index than that of the core 12. A material for forming the under-cladding layer 13 is not particularly limited, but is preferably a UV curable resin having excellent moldability. An appropriate one can be selected from the aforementioned UV curable resins accordingly as a UV curable resin.

The maximum difference in refractive index between the core 12 and the under-cladding layer 13 is preferably 0.01 or more, more preferably 0.02 to 0.2.

It is to be noted that the refractive index of the aforementioned UV curable resin can be increased or decreased by introducing an organic group appropriately selected into the UV curable resin or changing the organic group content of the UV curable resin. The refractive index of the UV curable resin can be increased by, for example, introducing a cyclic aromatic group (e.g., a phenyl group) into a resin molecule or increasing a cyclic aromatic group content per resin molecule. On the other hand, the refractive index of the UV curable resin can be decreased by, for example, introducing a linear or cyclic aliphatic group (e.g., a methyl group or a norbornene group) into a resin molecule or increasing a linear or cyclic aliphatic group content per resin molecule.

The under-cladding layer 13 preferably has a thickness of 10 to 50 µm.

[Over-Cladding Layer]

The over-cladding layer 14 to be used for the present invention has the convex lens portion 14a having a side sectional shape of substantially a quarter of a circle and the concave portion 14b to be fitted into the frame body 15 of the optical touch panel. The convex lens portion 14a is a shape formed by half cutting a lenticular lens (hog-backed lens) which is half-cut in a longitudinal direction. The convex lens portion 14a and the concave portion 14b are formed by, for example, feeding a liquid-state resin into a prescribed mold to be solidified or cured. The material for forming the over-cladding layer 14 is preferably the same as that of the under-cladding layer 13.

As shown in FIGS. 1(a) and 1(b), the optical waveguide 10 of the present invention is capable of converting diverging light emitted from the distal end 12a of the core 12 into parallel light 11a in the convex lens portion 14a. Further, it is possible for the optical waveguide 10 of the present invention to convert the parallel light 11b with a great width incident upon the surface of the convex lens portion 14a into light converging at the distal end 12a of the core 12 in the convex lens portion 14a. As a result, it becomes possible to improve use efficiency of light and obtain a high optical transmission efficiency.

Figure 3:
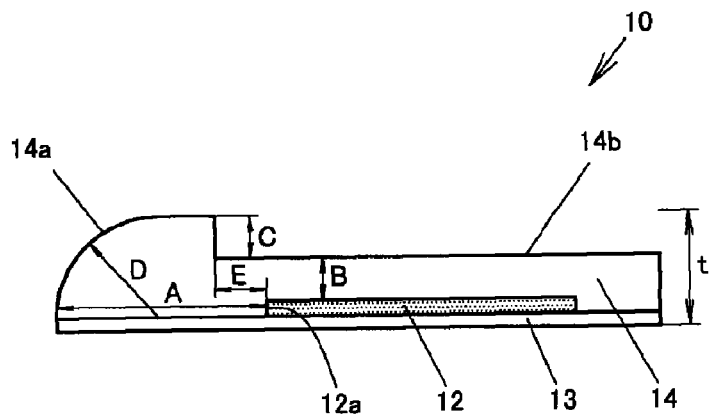
FIG. 3 illustrates dimensions of each part of the optical waveguide.

FIG. 3 shows an illustrative drawing of dimensions of respective parts of the optical waveguide 10 of the present invention. The radius of curvature D of the convex lens portion 14a is preferably set at 300 μm to 1.5 mm. The distance A from the distal end of the convex lens portion 14a to the distal end 12a of the core 12 is preferably set at 1 to 5 mm. The ratio A/D between the distance A and the radius of curvature D is preferably 2 to 6. Such a design can effectively convert the light emitted from the distal end 12a of the core 12 into the parallel light 11a in the convex lens portion 14a. In addition, the design can effectively collect the parallel light 11b with a great width incident upon the surface of the convex lens portion 14a at the distal end 12a of the core 12. This makes it possible to improve the optical transmission efficiency of the optical waveguide 10.

As shown in FIGS. 1(a) and 1(b), the concave portion 14b of the over-cladding layer 14 is formed outside the substantially fan-shaped region 16 (shaded portion) surrounded by the line segments to connect from the center of the distal end 12a of the core 12 to upper and lower ends of the convex lens portion 14a in the over-cladding layer 14 and the outer circle of the convex lens portion 14a so as not to block the outgoing light 11a and the incoming light 11b.

The depth C of the concave portion 14b in the over-cladding layer 14 shown in FIG. 3 is preferably 200 to 900 μm. When the depth C of the concave portion 14b is less than 200 μm, it becomes difficult to fit the concave portion 14b into the frame body 15, resulting in lower connection accuracy. When the depth C of the concave portion 14b is over 900 μm, the remaining thickness B of the over-cladding layer 14 becomes too small, which could lead to bad effects on the optical transmission of the core 12.

The remaining thickness B of the over-cladding layer 14 in the concave portion 14b is preferably 100 to 700 μm. When the remaining thickness B is less than 100 μm, the optical transmission of the core 12 could be adversely affected. When the remaining thickness B is over 700 μm, the depth C of the concave portion 14b in the over-cladding layer 14 becomes too small, which could lead to lower connection accuracy with the frame body 15.

The distance E between the distal end of the concave portion 14b and the distal end 12a of the core 12 is preferably 0 to 2 mm. When the distance E is smaller than 0, that is, minus, there are fears that the outside light 17 may enter the core 12 because the distal end 12a of the core 12 turns into a shape that is more protruding than the end of the concave portion 14b. When the distance E is over 2 mm, part of the concave portion 14b may enter into the substantially fan-shaped region 16 surrounded by the line segments to connect from the center of the distal end 12a of the core 12 to the upper and the lower ends of the convex lens portion 14a in the over-cladding layer 14 and the outer circle of the convex lens portion 14a shown in FIGS. 1(a) and 1(b), which could block the outgoing light 11a and the incoming light 11b.

The design that meets such a dimension relationship is capable of preventing the core 12 from being affected by the outside light 17 as well as preventing light traveling the core 12 from being affected by the concave portion 14b.

The concave portion 14b of the over-cladding layer 14 is fitted into the frame body 15 of the optical touch panel. Although the connection means is not particularly limited, but typically includes a method for curing an adhesive after applying the adhesive onto the surface of the concave portion 14b in the over-cladding layer 14 to fit the frame body 15 of the optical touch panel with the concave portion 14b.

Figure 4:
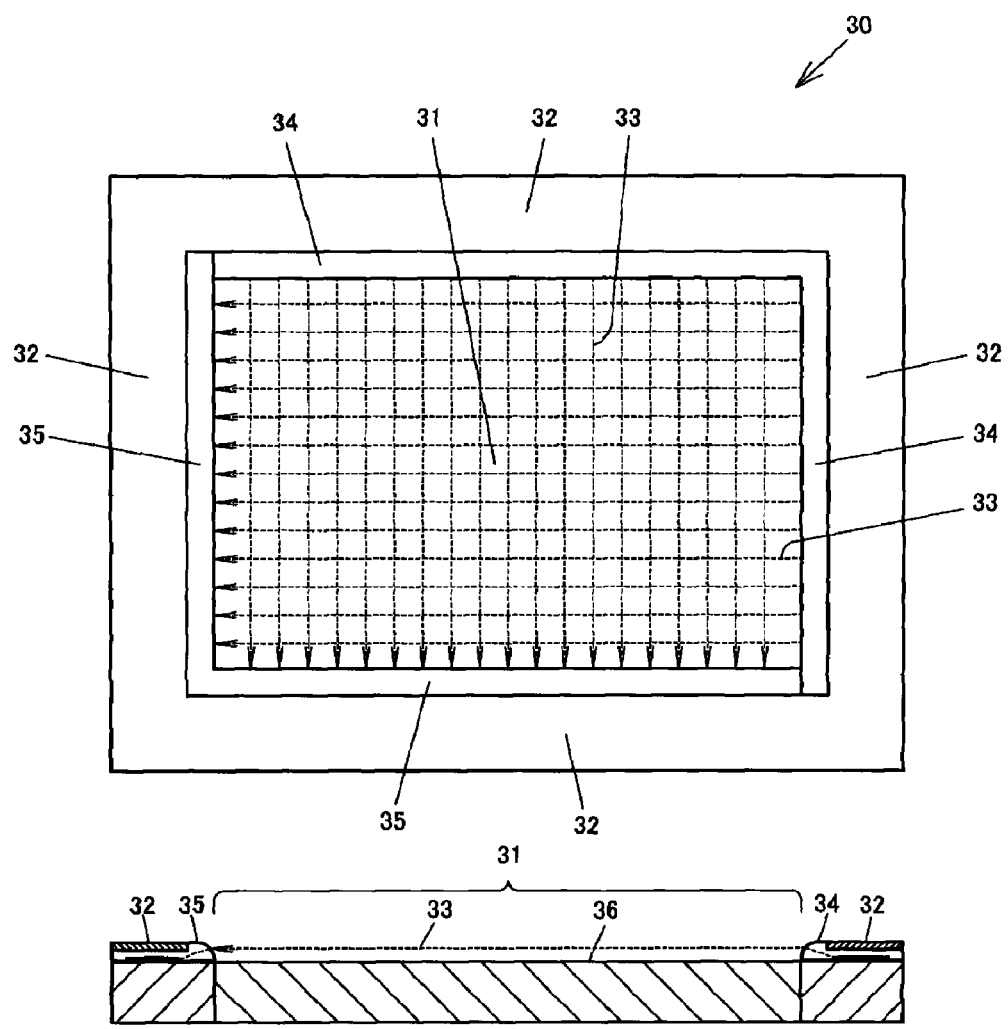
FIG. 4 is a schematic view of an optical touch panel of the present invention.

As shown in FIG. 4, an optical touch panel 30 of the present invention preferably comprises: a light-emitting element (not shown in the figure); a coordinate input region 31; a frame body 32 arranged around the coordinate input region 31; a light-emitting sided-optical waveguide 34 for guiding light emitted from the light-emitting element to generate light beams 33 for crossing the coordinate input region 31 and having an output end; a light-receiving sided-optical waveguide 35 for receiving the light beams 33 having crossed the coordinate input region 31 and having an input end; and a light-receiving element for detecting light intensity received at the light-receiving sided-optical waveguide 35 (not shown in the figure).

Moreover, the optical touch panel 30 of the present invention is preferably formed by fitting the concave portion 14b formed in the over-cladding layer 14 of at least one of the light-emitting sided-optical waveguide 34 and the light-receiving sided-optical waveguide 35 into the frame body 32.

In this specification, the coordinate input region 31 is referred to as a region where the light beams 33 generated from the light-emitting sided-optical waveguide 34 traverse. The coordinate input region 31 is typically a display screen 36, such as a liquid crystal display panel and a plasma display panel or the like. The coordinate input region 31 is preferably rectangular so as to make it possible to carry out easy positioning of the core 12. An open space may be provided in front (the surface of the operator's side) of the coordinate input region 31. Alternatively, a glass panel or an acrylic plate may be provided on the surface of the coordinate input region 31 to improve abrasion resistance.

The frame body 32 is arranged around the coordinate input region 31. The material that forms the frame body 32 is, typically an acrylic resin. Since the frame body 32 blocks the outside light 17 to reduce light entering the core 12, the frame body 32 preferably has a low transmission efficiency in the near-infrared area.

Any light-emitting element may be used as light-emitting element to be used in the present invention, as long as the light-emitting element generates the light beams 33 to transverse the coordinate input region 31. The wavelength of light emitted from the light-emitting element is preferably within the near-infrared area (700 to 2,500 nm). Examples of such a light-emitting element include light-emitting diode and a semi-conductor laser.

The light-receiving element to be used in the present invention converts an optical signal into an electrical signal to detect the intensity of light received at the light-receiving sided-optical waveguide 35. The light detected from the light-receiving element preferably has a wavelength within the near-infrared area (700 to 2,500 nm). Examples of such a light-receiving element include a Complementary Metal-oxide Semiconductor (CMOS) image sensor and a Charge Coupled Device (CDD) image sensor or the like.

EXAMPLE

Example

[Preparation of Cladding-Layer-Forming Varnish]
A varnish for forming a cladding layer was prepared by mixing 100 parts by weight of a UV-curable epoxy-based resin having an alicyclic skeleton (EP 4080E manufactured by ADEKA CORPORATION) (Component A) and 2 parts by weight of a photo-acid-generation agent (CPI-200K manufactured by SAN-APRO Ltd.) (Component B).

[Preparation of Varnish for Forming Cores]
A varnish for forming cores was prepared by mixing 40 parts by weight of a UV-curable epoxy-based resin having a fluorene skeleton (OGSOL EG manufactured by Osaka Gas Chemicals Co., Ltd.) (Component C), 30 parts by weight of a UV-curable epoxy-based resin having a fluorene skeleton (EX-1040 manufactured by Nagase ChemteX Corporation) (Component D), 30 parts by weight of 1,3,3-tris(4-(2-(3-oxetanyl))butoxyphenyl)butane (synthesized in accordance with Example 2 in JP 2007-070320 A) (Component E), 1 part by weight of the Component B, and 41 parts by weight of ethyl lactate.

[Formation of Optical Waveguide]

The varnish for forming a cladding layer was applied onto the surface of a polyethylene naphthalate film having a thickness of 188 μm, irradiated with UV light at 1,000 mJ/cm$^2$, and thermally-treated at 80° C. for 5 minutes to form an under-cladding layer (the refractive index as measured at a wavelength of 830 nm was 1.510) having a thickness of 20 μm.

Then, the varnish for forming cores was applied onto the surface of the under-cladding layer and thermally-treated at 100° C. for 5 minutes to form a core layer. The core layer was then covered with a photo mask, irradiated with UV light at 2,500 mJ/cm$^2$, and thermally-treated at 100° C. for 10 minutes. An unexposed portion of the core layer was dissolved away using an aqueous γ-butyrolactone solution to form a plurality of cores each having a width of 20 μm and a height of 50 μm (the refractive index as measured at a wavelength of 830 nm was 1.592).

A quartz molding die was placed on the surface of the aforementioned cores so as to cover the entire cores, and the cladding-layer-forming varnish was injected into the molding die. The cladding-layer-forming varnish was irradiated with UV rays at 2,000 mJ/cm$^2$ through the molding die and thermally-treated at 80° C. for 5 minutes. Then the molding die was released to form an over-cladding layer (the refractive index as measured at a wavelength of 830 nm was 1.510) with a convex lens having a side sectional shape of substantially a quarter of a circle at its distal end and a concave portion outside a substantially fan-shaped region surrounded by line segments to connect from the center of the distal end of the core to upper and lower ends of the convex lens portion and the outer circle of the convex lens portion.

In the optical waveguide produced in this way, respective dimensions shown in FIG. 3 were A=4 mm, B=0.65 mm, C=0.3 mm, D=1 mm, E=1 mm.

[Method for Producing Optical Touch Panel]

Four optical waveguides were prepared as the aforementioned optical waveguides. A concave portion in the over-cladding layer of each optical waveguide was coupled to each side of the frame-shaped frame body (made of acrylic resin) through an adhesive to align and fix the optical waveguide and produce an optical waveguide in the shape of a frame. Next, the aforementioned optical waveguide was fixed around the coordinate input region. Adjacent two optical waveguides were used as light-emitting sided-optical waveguide. The light-emitting element (VCSEL manufactured by Optowell) emitting infrared light having a wavelength of 850 nm was optically coupled to a distal end of each core end through a UV curable adhesive.

Other two adjacent optical waveguides were used as light-receiving side-optical waveguide. A light-receiving element (CMOS linear sensor array manufactured by TAOS Inc.) was optically coupled to a distal end of each core of the light-receiving sided-optical waveguides through a UV curable adhesive.

In an optical touch panel produced in such a manner where the light intensity of the light-emitting element is 100%, the light intensity of detecting at the light-receiving element was 10% when not blocking the coordinate input region. Further, when light beams passing through the coordinate input region were blocked by a finger, it was possible to confirm the position coordinates to be accurately detected.

Furthermore, it was possible to use the optical touch panel without any problems even under the environment of illuminance of 5,400 lux in which a conventional optical touch panel was difficult to normally operate.

Measurement Methods

[Refractive Index]

A cladding-layer-varnish and a varnish for forming cores were respectively applied onto a silicon wafer by spin coating to form a film of the varnish, and the film was used as a sample for measuring the refractive index of a cladding layer and cores. Measurement of refractive index was performed using a prism coupler (manufactured by Sairon Technology, Inc.).

[Width and Height of Core]

An optical waveguide was cut crosswise using a dicing saw (DAD522 manufactured by DISCO Corporation), and the cutting surface of the optical waveguide was observed using a laser microscope (manufactured by Keyence Corporation) to measure the width and height of each core.

[Industrial Applicability]

The optical touch panel of the present invention is particularly suitable for a touch panel having a great load where environmental conditions are severe, such as ATM systems, railway ticket-vending machines, factory automation systems, copying machines, shop POS systems, and game machines for industrial uses.

This application claims priority from Japanese Patent Application No. 2009-055103, which is incorporated herein by reference.

There have thus been shown and described a novel optical waveguide and a novel optical touch panel which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An optical waveguide comprising:
   a core having a distal end from which light is emitted or on which light is incident;
   an under-cladding layer for supporting the core; and
   an over-cladding layer wherein the core is embedded, the optical waveguide being arranged in contact with a frame body of an optical touch panel, and the over-cladding layer has a convex lens portion having a side sectional shape of substantially a quarter of a circle and a concave portion to be fitted into the frame body of the optical touch panel,
   wherein the concave portion is located outside a fan-shaped region surrounded by line segments to connect from the center of the distal end of the core to an upper end and a lower end of the convex lens portion of the over-cladding layer and a circle of the convex lens portion.

2. The optical waveguide according to claim 1, wherein the over-cladding layer embeds the entire core.

3. The optical waveguide according to claim 1, wherein the core has a higher refractive index than the under-cladding layer and the over-cladding layer and the refractive index difference among the core, the under-cladding layer, and the over-cladding layer is from 0.02 to 0.2.

4. The optical waveguide according to claim 1 or 2, wherein the core, the under-cladding layer, and the over-cladding layer are respectively formed from a UV curable resin.

5. The optical waveguide according to claim 1 or 2, when the radius of curvature of the convex lens portion of the over-cladding layer is D, the radius of curvature D is 300 µm to 1.5 mm.

6. The optical waveguide according to claim 1 or 2, when the distance from a distal end of the convex lens portion of the over-cladding layer to the distal end of the core is A, the distance A is 1 to 5 mm and the ratio A/D between the distance A and the radius of curvature D of the convex lens portion is 2 to 6.

7. The optical waveguide according to claim 1 or 2, wherein the concave portion of the over-cladding layer has a depth of 200 to 900 µm and the over-cladding layer in the concave portion has a remaining depth of 100 to 700 µm.

8. An optical touch panel having an optical waveguide according to claim 1 or 2, wherein the concave portion of the over-cladding layer in the optical waveguide is fitted into the frame body of the optical touch panel.

\* \* \* \* \*